United States Patent
Runeson

(10) Patent No.: US 9,584,341 B2
(45) Date of Patent: Feb. 28, 2017

(54) MODEM INTERFACE USING VIRTUAL LOCAL-AREA NETWORK TAGGING

(71) Applicant: Telefonaktiebolaget L M Ericsson (publ), Stockholm (SE)

(72) Inventor: Stefan Runeson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/307,572

(22) Filed: Jun. 18, 2014

(65) Prior Publication Data

US 2015/0372839 A1 Dec. 24, 2015

(51) Int. Cl.
*H04B 1/38* (2015.01)
*H04L 5/16* (2006.01)
*H04L 12/46* (2006.01)

(52) U.S. Cl.
CPC ................. *H04L 12/4645* (2013.01)

(58) Field of Classification Search
None
See application file for complete search history.

(56) References Cited

U.S. PATENT DOCUMENTS

| 6,092,110 A | 7/2000 | Maria et al. |
| 2003/0028674 A1 | 2/2003 | Boden et al. |
| 2004/0073671 A1 | 4/2004 | Maria et al. |
| 2006/0026682 A1 | 2/2006 | Zakas et al. |
| 2007/0156919 A1* | 7/2007 | Potti ............ G06F 8/67 709/238 |
| 2009/0209291 A1 | 8/2009 | Ramprasad et al. |
| 2011/0249564 A1 | 10/2011 | Cho et al. |

(Continued)

FOREIGN PATENT DOCUMENTS

| EP | 1328091 A1 | 7/2003 |
| EP | 1703672 A1 | 9/2006 |
| WO | 2013053550 A1 | 4/2013 |

OTHER PUBLICATIONS

IEEE, "IEEE Std 802.1Q", IEEE Standard for Local and metropolitan area networks, Virtual Bridged Local Area Networks, May 19, 2006, 1-303.

*Primary Examiner* — Chieh M Fan
*Assistant Examiner* — Wednel Cadeau
(74) *Attorney, Agent, or Firm* — Murphy, Bilak & Homiller, PLLC

(57) ABSTRACT

An interface between an application processor device and a modem device uses virtual local-area network (VLAN) tagging of Ethernet frames. An example modem device includes a first interface circuit configured to communicate with a remote device, a second interface circuit configured to communicate with an application processor circuit, and a processing circuit configured to: provide the application processor circuit with IP-based data communications to and from at least one remote IP network using Ethernet frames exchanged between the application processor circuit and the modem device; provide the application processor circuit with local modem services, using Ethernet frames exchanged between the application processor and the modem device; and distinguish between Ethernet frames for the local modem services and Ethernet frames for the IP-based data communication to and from the remote IP network using differing VLAN identifiers attached to or included within the respective Ethernet frames.

15 Claims, 7 Drawing Sheets

(56) References Cited

U.S. PATENT DOCUMENTS

2011/0280187 A1 11/2011 Meyer et al.
2011/0314145 A1 12/2011 Raleigh et al.
2013/0170451 A1 7/2013 Krause et al.

* cited by examiner

| ETHERNET | | | | |
| --- | --- | --- | --- | --- |
| NCM | | | SHARED MEMORY | |
| CDC | | | LLI | PCIe |
| USB 2.0 / 3.0 | | | | |
| USB 2.0 PHY | HSIC PHY | M-PHY | M-PHY | PCIe PHY |
| USB 2.0 | HSIC | SSIC | LLI | PCIe |

| AT | Debug | Log | File | ... |
|----|-------|-----|------|-----|
| TCP/UDP |||||
| IP |||||
| Ethernet |||||

US 9,584,341 B2

MODEM INTERFACE USING VIRTUAL LOCAL-AREA NETWORK TAGGING

TECHNICAL FIELD

The presently disclosed techniques relate generally to devices for use in wireless communication networks, and more particularly relate to an interface between a modem device and an application processor device in wireless communications devices.

BACKGROUND

Many wireless communication devices, including simple cellular telephones, so-called smart phones, and wireless tablet devices, include a cellular modem device. A cellular modem device of a particular type (e.g., from a particular manufacturer and/or for a particular radio access technology) may be used in many different types of products. As a result, the integration of the modem device into these various products can put a variety of dissimilar requirements on the modem device's interfaces.

FIG. 1 illustrates several dimensions of these varying requirements. The interface to the modem device may work with any one or more of several physical interfaces, such as the Universal Serial Bus (USB), the USB High-Speed Inter-Chip (HSIC) interface, the USB Super-Speed Inter-Chip (SSIC), The Peripheral Component Interconnect express (PCIe) interface, and the Low Latency Interface (LLI). The modem interface shall also be compatible with a variety of different application processors, e.g., the application processors in smartphones or tablet computers, the CPUs in desktop or laptop computers, and control systems of various types in Machine-to-Machine (M2M) applications. Finally, the modem interface shall work with different operating systems, such as Linux, Windows, OS X, and various real-time operating systems.

A common denominator for all physical interfaces, all applications processors, and most operating systems is a general ability to handle Ethernet devices. It is possible to emulate an Ethernet interface on all these physical interfaces and all application processors, and most operating systems handle Ethernet devices. A natural choice is thus to expose the modem as an Ethernet interface and hide all differences between various physical interfaces below Ethernet.

This exposure of the modem device to application processors as an Ethernet device is illustrated in FIG. 2. As suggested by the figure, the modem device may support interconnections to the applications processor via any of several physical interfaces, such as USB 2.0, HSIC, SSIC, LLI, and PCIe. An Ethernet layer sits on top of each of these physical interfaces, allowing an applications processor that supports any one or more of these physical interfaces to communicate with the modem device at the Ethernet layer, i.e., using Ethernet frames. As seen in the figure, the Ethernet layer sits on top of a Network Control Model (NCM) layer and a Communications Device Class (CDC) layer for the USB-related physical interfaces (USB 2.0, HSIC, and SSIC), and sits on top of a shared memory for the LLI and PCIe physical interfaces.

Another common denominator for all application processors and most operating systems is the ability to handle an Internet Protocol (IP) socket applications programming interface (API). A natural choice, therefore, is for the modem device to expose all modem services to the application processor on an IP socket API to the application processor. This is shown in FIG. 3, where several modem services, including a control channel for modem control (e.g., using so-called AT commands), debugging, and logging services are provided to an application processor device via a TCP/UDP layer and an IP layer, on top of the Ethernet interface discussed above. With this configuration, a local IP network between the modem device and the application processor is used to expose modem services to the application processor, on an IP socket API. This is shown generally in the block diagram of FIG. 4.

SUMMARY

One problem that arises with current modem devices is that the application processor would like to connect to one or more different IP networks, through the modem device, over the Ethernet interface provided by the modem device. In particular, one or more applications on the application processor would like to use a remote IP network via a Packet Data Network (PDN) connection to a PDN Gateway in the mobile communications network. In some cases, the application processor would like to connect to several remote IP networks simultaneously, via multiple PDN connections. At the same time, the application processor would also like to use the local IP network and utilize the modem services provided through the modem's TCP/IP or UDP/IP stack.

To distinguish between traffic intended for local modem services provided by the modem device and traffic intended for a remote IP network, the modem device conventionally has to do packet inspection on the IP level, and possibly even on the TCP or UDP layer, to forward the packets to correct IP network. This requires a lot of CPU power in the modem devices. In some situations, it may be impossible to distinguish between traffic targeted to different IP networks, due to the reuse of IP addresses among different IP networks.

According to several embodiments of the presently disclosed methods and apparatus, an interface between an application processor device and a modem device uses virtual local-area network (VLAN) tagging of Ethernet frames, to distinguish between Ethernet frames for local modem services provided by the modem device and Ethernet frames for one or more IP-based data communications sessions to and from at least one remote IP network.

An example modem device includes a first interface circuit configured to communicate with a remote device, a second interface circuit configured to communicate with an application processor circuit, and a modem processing circuit configured to: provide the application processor circuit with IP-based data communications to and from at least one remote IP network using Ethernet frames exchanged between the application processor circuit and the modem device; provide the application processor circuit with one or more local modem services, using Ethernet frames exchanged between the application processor and the modem device; and distinguish between Ethernet frames for the local modem services and Ethernet frames for the IP-based data communication to and from the remote IP network using differing VLAN identifiers attached to or included within the respective Ethernet frames.

In some embodiments, the modem processing circuit is configured to distinguish between Ethernet frames for the local modem services and Ethernet frames for the IP-based communication to and from the at least one remote IP network by: detecting a first VLAN identifier value attached to or included within one or more first Ethernet frames received from the application processor circuit and processing the one or more first Ethernet frames to provide the application processor circuit with the one or more local modem services; and detecting a second VLAN identifier value attached to or included within one or more second Ethernet frames received from the application processor circuit and forwarding IP packets carried by the one or more second IP Ethernet frames to the remotely located device, via the first interface circuit, for delivery to a first remote IP network.

In some embodiments, the modem device is configured to support two or more PDN connections between the application processor and the at least one remote IP network. Thus, in some embodiments, the modem processing circuit is configured to distinguish between Ethernet frames corresponding to each of the two or more remote IP networks using differing VLAN identifiers attached to or included within the respective Ethernet frames. This may be done, for example, by: detecting a first VLAN identifier value attached to or included within one or more first Ethernet frames received from the application processor circuit and forwarding IP packets carried by the one or more first IP Ethernet frames to the remotely located device, via the first interface circuit, using a first PDN connection; and detecting a second VLAN identifier value attached to or included within one or more second Ethernet frames received from the application processor circuit and forwarding IP packets carried by the one or more second IP Ethernet frames to the remotely located device, via the first interface circuit, using a second PDN connection.

Other embodiments of the disclosed techniques and apparatus include application processor circuits corresponding to the modem devices summarized above. An example application processor circuit comprises an interface circuit configured to communicate with a modem device, and a processing circuit. The processing circuit is configured to: communicate with at least one remote IP network using Internet Protocol (IP)-based data communications, using Ethernet frames exchanged between the application processor circuit and the modem device via the interface circuit; access one or more local modem services provided by the modem device, using an IP socket application programming interface (API) and using Ethernet frames exchanged between the application processor circuit and the modem device via the interface circuit; and distinguish between Ethernet frames for the local modem services and Ethernet frames for IP-based data communications to and from the at least one remote IP network using differing VLAN identifiers attached to or included within the respective Ethernet frames.

In some embodiments, the processing circuit is configured to distinguish between Ethernet frames for the local modem services and Ethernet frames for the IP-based data communication to and from the at least one remote IP network by attaching a first VLAN identifier value to or in one or more first Ethernet frames sent to the modem device for accessing the one or more local modem services and attaching a second VLAN identifier value to or in one or more second Ethernet frames sent to the modem device and containing IP packets to be delivered to a first remote IP network. In some embodiments, the application processor's processing circuit is configured to communicate with two or more remote IP networks using IP-based data communications, using Ethernet frames exchanged between the application processor circuit and the modem device via the interface circuit, and wherein the processing circuit is configured to distinguish between Ethernet frames sent to each of the two or more remote IP networks using differing VLAN identifiers attached to or included within the respective Ethernet frames.

Methods suitable for implementation in modem devices and application processor circuits like those described above are also disclosed. An example method, implemented in a modem device that comprises a first interface circuit configured to communicate with a remotely located device, a second interface circuit configured to communicate with an application processor circuit, and a modem processing circuit, comprises: providing the application processor circuit with IP-based data communications to and from at least one remote IP network, via the first and second interface circuits, using Ethernet frames exchanged between the application processor circuit and the modem device via the second interface circuit; providing the application processor circuit with one or more local modem services, using an IP socket API and using Ethernet frames exchanged between the application processor circuit and the modem device via the second interface circuit; and distinguishing between Ethernet frames for the local modem services and Ethernet frames for the IP-based data communication to and from the at least one remote IP network using differing VLAN identifiers attached to or included within the respective Ethernet frames.

Similarly, an example method implemented in an application processor circuit that comprises a processing circuit and an interface circuit configured to communicate with a modem device comprises: communicating with at least one remote IP network using IP-based data communications, using Ethernet frames exchanged between the application processor circuit and the modem device via the interface circuit; accessing one or more local modem services provided by the modem device, using an IP socket API and using Ethernet frames exchanged between the application processor circuit and the modem device via the interface circuit; and distinguishing between Ethernet frames for the local modem services and Ethernet frames for IP-based data communications to and from the at least one remote IP network using differing VLAN identifiers attached to or included within the respective Ethernet frames.

BRIEF DESCRIPTION OF THE DRAWINGS

The accompanying drawings, which are included to provide a further understanding of the disclosure and are incorporated in and constitute a part of this disclosure, illustrate certain non-limiting embodiment(s) of the methods and apparatus described herein. In the drawings.

DETAILED DESCRIPTION

In the following detailed description, numerous specific details are set forth in order to provide a thorough understanding of the techniques and apparatus disclosed herein. However, it will be understood by those skilled in the art that the present techniques may be practiced without these specific details. In other instances, well-known methods, procedures, components and circuits have not been described in detail so as not to obscure the present disclosure.

Figure 5:
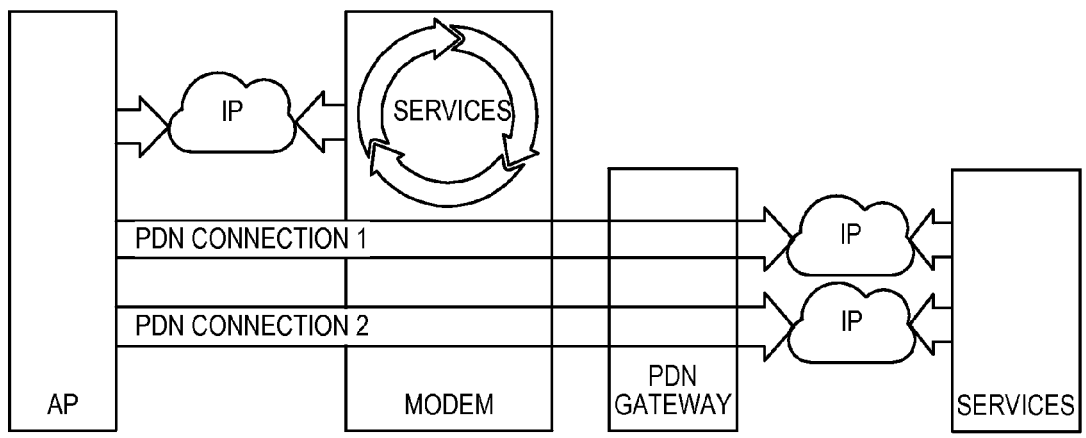
FIG. 5 is a block diagram illustrating a local IP network between a modem device and an application processor and between the application processor and remote IP network(s) via Packet Data Network (PDN) connections.

One problem that arises with current modem devices is that the application processor would like to connect to one or more different IP networks, through the modem device, over the Ethernet interface provided by the modem device. In particular, one or more applications on the application processor would like to use a remote IP network via a Packet Data Network (PDN) connection to a PDN Gateway in the mobile communications network. In some cases, the application processor would like to connect to several remote IP networks simultaneously, via multiple PDN connections. At the same time, the application processor would also like to use the local IP network and utilize the modem services provided through the modem's TCP/IP or UDP/IP stack. This is shown in FIG. 5, which illustrates a local IP session between the application processor AP and the modem device as well as two IP-based data sessions between the application processor and remote IP-based services, where the IP-based data sessions pass through the modem device and a PDN gateway in the mobile communications network.

To distinguish between traffic intended for local modem services provided by the modem device and traffic intended for a remote IP network, the modem device conventionally has to do packet inspection on the IP level, and possibly even on the TCP or UDP layer, to forward the packets to correct IP network. This requires a lot of central processing unit (CPU) power in the modem devices. In some situations, it may be impossible to distinguish between traffic targeted to different IP networks, due to the reuse of IP addresses among different IP networks.

This problem may be addressed by having the modem device support the addressing of Virtual Local-Area Network (VLANs), on top of the Ethernet interface. The support for VLANs may be provided in a manner that is consistent with IEEE 802.1Q standards, for example. The VLAN addressing may be used by the modem device in two ways: to distinguish traffic targeted to the internal TCP/IP stack on the modem device from traffic targeted to a PDN connection (e.g., PDN Gateway), using different VLAN identifiers associated with the Ethernet frames exchanged between the application processor and the modem device; and to distinguish traffic to and from multiple different PDN connections, using different VLAN identifiers associated with the Ethernet frames exchanged between the application processor and the modem device.

This approach can be used to provide two major benefits. First, the amount of CPU power needed in the modem can be drastically reduced, by using VLAN addressing instead of packet inspection on the IP level (and UDP or TCP level). Second, the modem can distinguish traffic between any IP networks, even if IP addresses are reused between different IP networks.

Figure 6:
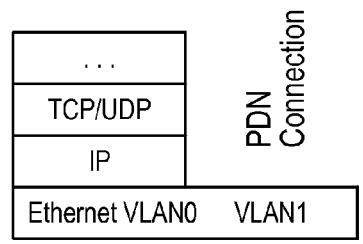
FIG. 6 illustrates the distinguishing between traffic to a local TCP/IP stack on a modem device from traffic to a PDN connection, using different VLAN identifiers.

FIG. 6 illustrates the basic concept. As seen in the figure, traffic to the local TCP/IP stack on the modem device is distinguished from traffic to the PDN Gateway (PDN connection) using different VLAN identifiers included in or associated with the Ethernet frames exchanged between the modem device and the applications processor circuit. The VLAN for the local IP network, which is connected to the TCP/IP stack on the modem (VLAN0), is created when the application processor and modem device start up. The application processor may then use the modem services (e.g., AT commands) to establish a PDN connection to the PDN Gateway. The modem device allocates a new VLAN identifier (VLAN1) to be used for Ethernet frames exchanged between the application processor and the modem device for the PDN Connection.

Figure 7:
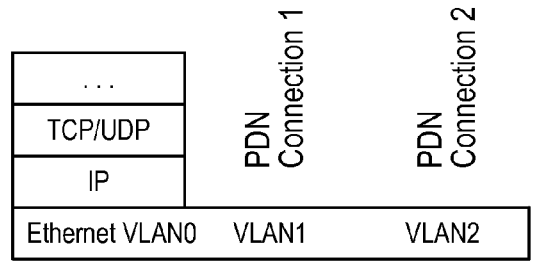
FIG. 7 illustrates the distinguishing between traffic to different PDN connections, using different VLAN identifiers.

This approach can be extended to provide for multiple PDN connections to one or several remote IP networks. This extension is shown in FIG. 7, which illustrates that the modem device distinguishes between traffic to different PDN connections using different VLAN identifiers included in or associated with the Ethernet frames. The modem device allocates a new VLAN identifier (VLANx) for each PDN connection, as it is set up.

In view of the techniques described above, it will be appreciated that FIG. 8 illustrates a method, as implemented in a modem device that includes: a first interface circuit configured to communicate with a remotely located device, such as a PDN gateway; a second interface circuit configured to communicate with an application processor circuit; and a modem processing circuit. As shown at block 82, the method includes providing the application processor circuit with IP-based data communications to and from at least one remote IP network, via the first and second interface circuits, using Ethernet frames exchanged between the application processor circuit and the modem device via the second interface circuit. As seen at block 84, the method further includes providing the application processor circuit with one or more local modem services, using an IP socket application programming interface (API) and using Ethernet frames exchanged between the application processor circuit and the modem device via the second interface circuit. Finally, as seen at block 86, the illustrated method includes distinguishing between Ethernet frames for the local modem services and Ethernet frames for the IP-based data communication to and from the at least one remote IP network using differing VLAN identifiers attached to or included within the respective Ethernet frames.

Figure 9:
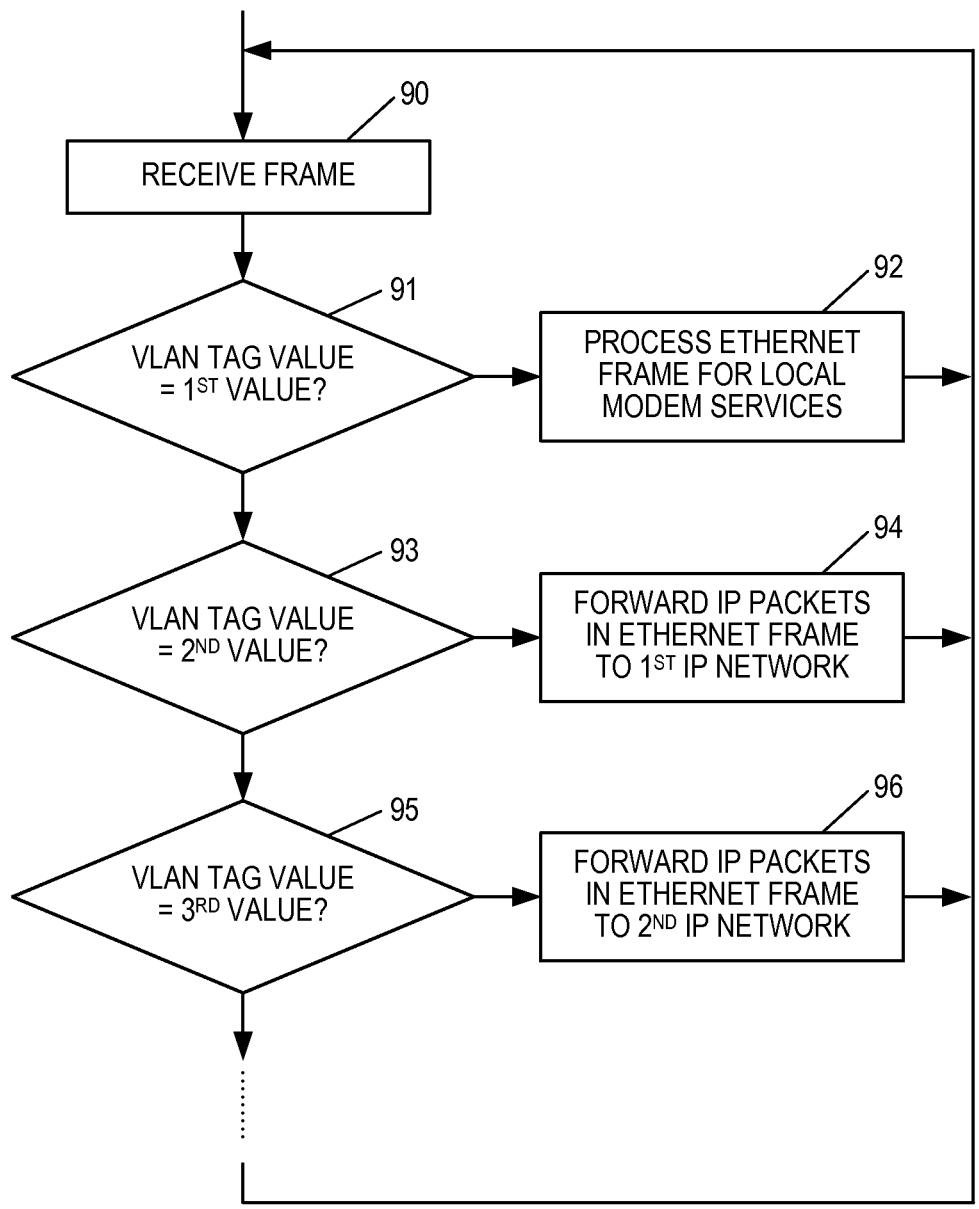
FIG. 9 is another process flow diagram illustrating an example method according to the presently disclosed techniques.

FIG. 9 is a process flow diagram illustrating additional details of an example method for distinguishing between Ethernet frames for the local modem services and Ethernet frames for the IP-based data communication to and from the at least one remote IP network using differing VLAN identifiers attached to or included within the respective Ethernet frames. The process flow of FIG. 9, which is repeated for each Ethernet frame received by the modem device, begins with receiving a frame, as shown at block 90. The frame is inspected to determine whether it is attached to or includes a VLAN identifier (or "tag") value that equals a first pre-determined value, as shown at block 91. If it does, the Ethernet frame is processed for local modem services, as shown at block 92.

Otherwise, the frame is inspected to determine whether it is attached to or includes a VLAN identifier (or "tag") value that equals a second pre-determined value, as shown at block 93. If it does, the IP packets in the Ethernet frame are forwarded to a first IP network, via a PDN gateway in the wireless communications system, for example, as shown at block 94. If the frame does not include either the first or second VLAN identifier value, it is inspected to determine whether it is attached to or includes a VLAN identifier (or "tag") value that equals a third pre-determined value, as shown at block 95. If it does, the IP packets in the Ethernet frame are forwarded to a second IP network, as shown at block 96. It will be appreciated that the illustrated method can be extended to support more than two IP connections to remote IP networks.

Figure 8:
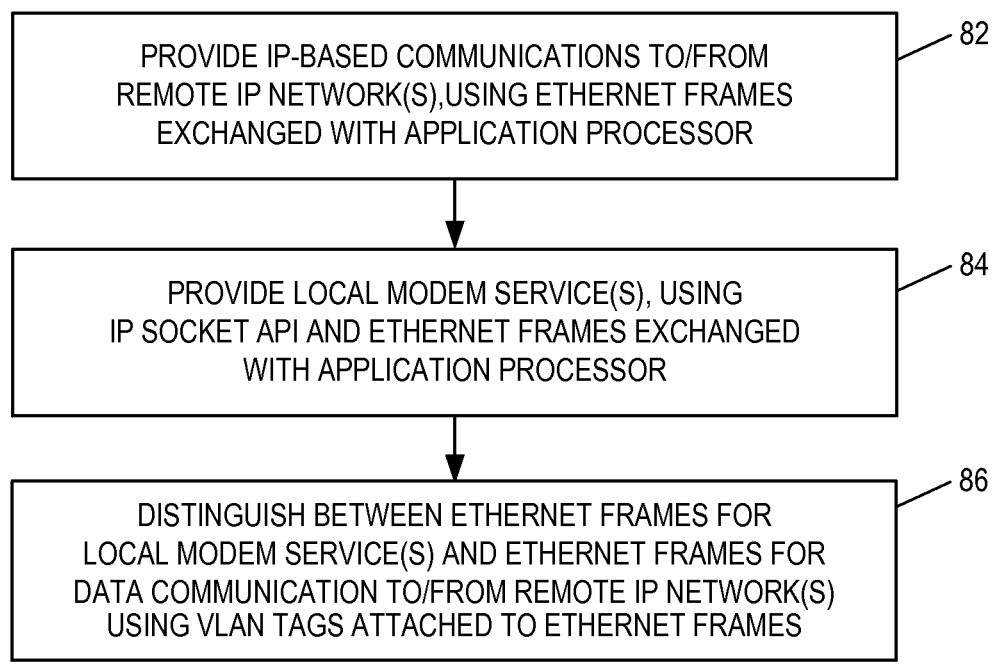
FIG. 8 is a process flow diagram illustrating an example method according to the presently disclosed techniques, as carried out by an example modem device.

Accordingly, in some embodiments of the method illustrated generally in FIG. 8, distinguishing between Ethernet frames for the local modem services and Ethernet frames for the IP-based data communication to and from the at least one remote IP network comprises detecting a first VLAN identifier value attached to one or more first Ethernet frames received from the application processor circuit and processing the one or more first Ethernet frames to provide the application processor circuit with the one or more local modem services, and detecting a second VLAN identifier value attached to one or more second Ethernet frames received from the application processor and forwarding IP packets carried by the one or more second IP Ethernet frames to the remotely located device, via the first interface circuit ,for delivery to a first remote IP network. Alternatively, in some embodiments, the modem device may provide the application processor with IP-based data communication to and from two or more remote IP networks, via the first and second interface circuits, using Ethernet frames exchanged between the application processor and the modem device via the second interface circuit. In this case, the method further comprises distinguishing between Ethernet frames corresponding to each of the two or more remote IP networks using differing VLAN identifiers attached to or included within the respective Ethernet frames, e.g., by detecting a first VLAN tag value attached to one or more first Ethernet frames received from the application processor and attached to one or more first Ethernet frames received from the application processor and forwarding IP packets carried by the one or more first IP Ethernet frames to the remotely located device, via the first interface circuit using a first PDN connection, and detecting a second VLAN tag value attached to one or more second Ethernet frames received from the application processor and forwarding IP packets carried by the one or more second IP Ethernet frames to the remotely located device, via the first interface circuit, using a second PDN connection. Both of these alternatives may be combined, of course, as shown in FIG. 9.

Figure 10:
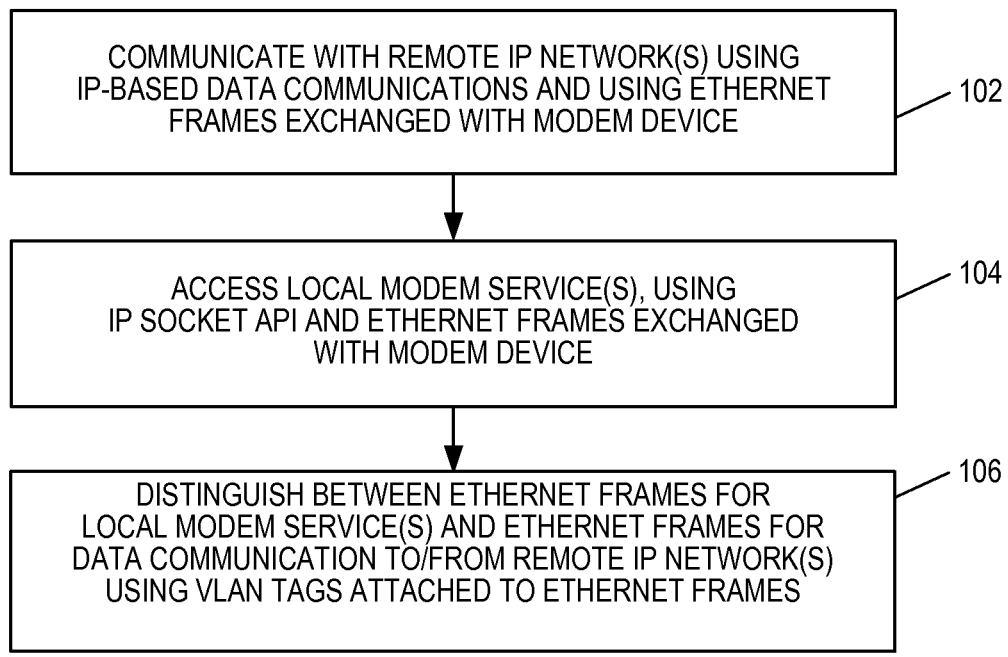
FIG. 10 is a process flow diagram illustrating an example method according to the presently disclosed techniques, as carried out by an example application processor circuit.

FIG. 10 illustrates a method that, complementary to the method shown in FIG. 8, is suitable for implementation in an application processor circuit that comprises a processing circuit and an interface circuit configured to communicate with a modem device. As shown at block 102, the method includes communicating with at least one remote IP network using IP-based data communications, using Ethernet frames exchanged between the application processor circuit and the modem device via the interface circuit. As shown at block 104, the method further includes accessing one or more local modem services provided by the modem device, using an IP socket API and using Ethernet frames exchanged between the application processor circuit and the modem device via the interface circuit. Finally, as shown at block 106, the method includes distinguishing between Ethernet frames for the local modem services and Ethernet frames for IP-based data communications to and from the at least one remote IP network using differing VLAN tags attached to the respective Ethernet frames.

In some embodiments, distinguishing between Ethernet frames for the local modem services and Ethernet frames for the IP-based data communication to and from the at least one remote IP network comprises: attaching a first VLAN tag value to or in one or more first Ethernet frames sent to the modem device for accessing the one or more local modem services; and attaching a second VLAN tag value to or in one or more second Ethernet frames sent to the modem device and containing IP packets to be delivered to a first remote IP network. In other embodiments, communicating with at least one remote IP network using IP-based data communications comprises communicating with two or more remote IP networks using IP-based data communications, using Ethernet frames exchanged between the application processor circuit and the modem device via the interface circuit, and wherein the method further comprises distinguishing between Ethernet frames sent to each of the two or more remote IP networks using differing VLAN tags attached to the respective Ethernet frames. Of course, both of these alternatives may be supported in some embodiments.

Figures 1, 2:
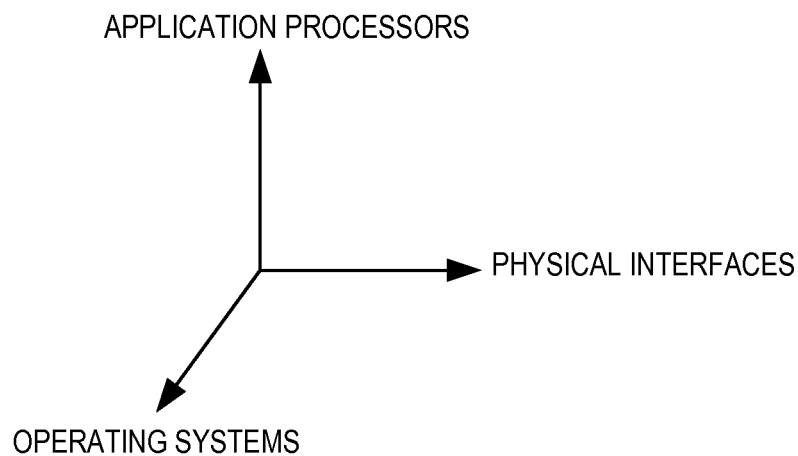
FIG. 1 illustrates several different design aspects that impact modem integration.
FIG. 2 illustrates the exposure of a modem device as an Ethernet device to application processor, where such exposure is irrespective of the physical interface.
Figures 3, 4:
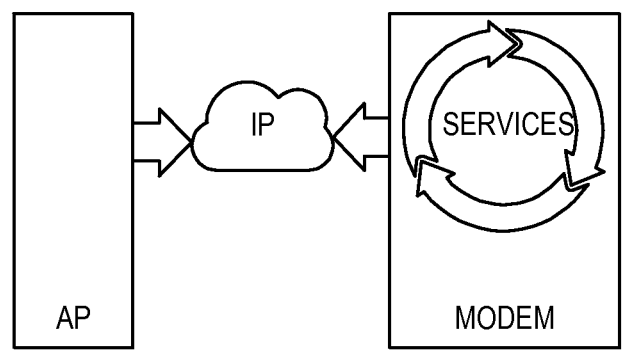
FIG. 3 illustrates the exposure of example modem services to an application processor, using an IP socket application programming interface (API)
FIG. 4 illustrates a local IP network between a modem device and an application processor.
Figure 11:
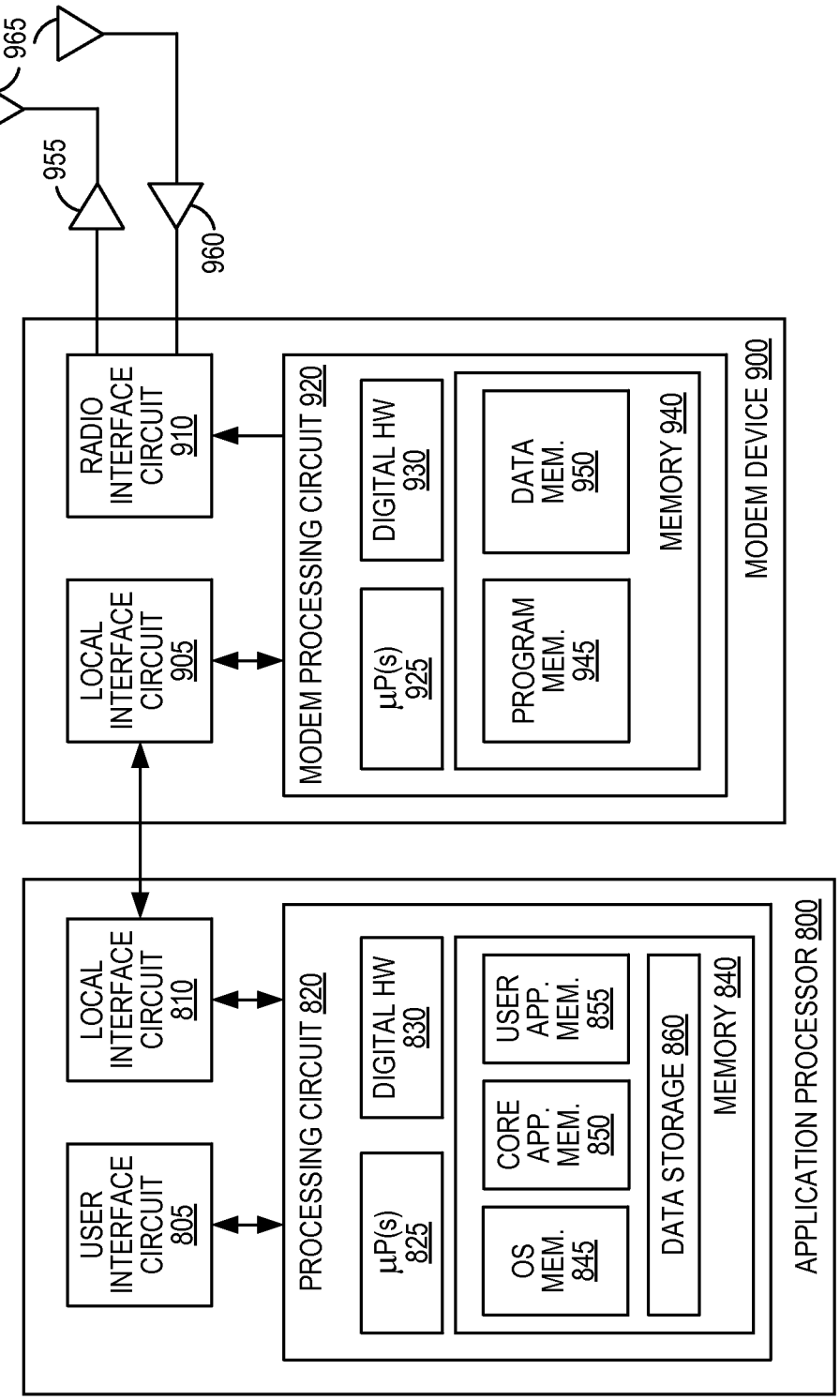
FIG. 11 is a block diagram illustrating functional components of an example modem device and an example application processor circuit.

FIG. 11 illustrates an example modem device 900 and an example application processor 800, where each is configured to carry out one or more of the methods described above. Modem device 900 includes a radio interface circuit 910 configured to communicate with a remote device, using radio circuits 955 and 960 and antennas 965. Modem device 900 further includes a local interface circuit 905 configured to communicate with application processor circuit 800 using Ethernet frames and, for example, one or more of the physical interfaces discussed above in connection with FIG. 2. Modem device still further includes a modem processing circuit 920, which is configured to carry out one or more of the techniques detailed above, including those methods illustrated in FIGS. 8 and 9, as well as variants thereof.

More particularly, modem processor circuit 920 includes one or more microprocessors or microcontrollers 925, as well as other digital hardware 930, which may include digital signal processors (DSPs), special-purpose digital logic, and the like. Modem processor circuit 920 further includes a memory circuit 940, which is configured to provide program memory 945 and data memory 945; either or both of microprocessor(s) 925 and digital hardware 930 may be configured to execute program code stored in program memory 945, using data memory 950. Because the various details and engineering tradeoffs associated with the design of processing circuitry for mobile devices and the like are well known and are unnecessary to a full understanding of the invention, additional details are not shown here.

The program code stored in the program memory portion 945 of memory 940, which may comprise one or several types of memory such as read-only memory (ROM), random-access memory, cache memory, flash memory devices, optical storage devices, etc., includes program instructions for executing one or more telecommunications and/or data communications protocols, using radio interface circuit 910, as well as instructions for controlling local interface 905 and communicating with application processor 800 and, in some embodiments, one or more peripheral devices. Program memory 945 may further contain instructions for carrying out one or more of the techniques detailed herein, in several embodiments. In some embodiments, then, modem processor circuit 920, is configured, using appropriate program code stored in memory 940, to: provide the application processor circuit 800 with IP-based data communications to and from at least one remote IP network using Ethernet frames exchanged between the application processor circuit 800 and the modem device 900; provide the application processor circuit 800 with one or more local modem services, using Ethernet frames exchanged between the application processor circuit 800 and the modem device 900; and distinguish between Ethernet frames for the local modem services and Ethernet frames for the IP-based data communication to and from the remote IP network using differing VLAN identifiers attached to or included within the respective Ethernet frames.

In some embodiments, the modem processing circuit 920 is configured to distinguish between Ethernet frames for the local modem services and Ethernet frames for the IP-based communication to and from the at least one remote IP network by: detecting a first VLAN identifier value attached to or included within one or more first Ethernet frames received from the application processor circuit 800 and processing the one or more first Ethernet frames to provide the application processor circuit 800 with the one or more local modem services; and detecting a second VLAN identifier value attached to or included within one or more second Ethernet frames received from the application processor circuit 800 and forwarding IP packets carried by the one or more second IP Ethernet frames to the remotely located device, via the radio interface circuit 910, for delivery to a first remote IP network.

In some embodiments, the modem device 900 is configured to support two or more PDN connections between the application processor 800 and the at least one remote IP network. Thus, in some embodiments, the modem processing circuit 920 is configured to distinguish between Ethernet frames corresponding to each of the two or more remote IP networks using differing VLAN identifiers attached to or included within the respective Ethernet frames. This may be done, for example, by: detecting a first VLAN identifier value attached to or included within one or more first Ethernet frames received from the application processor circuit 800 and forwarding IP packets carried by the one or more first IP Ethernet frames to the remotely located device, via the radio interface circuit 910, using a first PDN connection; and detecting a second VLAN identifier value attached to or included within one or more second Ethernet frames received from the application processor circuit 800 and forwarding IP packets carried by the one or more second IP Ethernet frames to the remotely located device, via the radio interface circuit 910, using a second PDN connection.

FIG. 11 also illustrates details of an example application processor circuit 800, which operates with the modem device 900 described above. The application processor circuit 800 comprises one or more user-interface circuits 805, which may include, for example, a touch-screen interface, a keypad, audio input and output circuits, etc. Application processor circuit 800 further comprises an interface circuit 810 configured to communicate with modem device 900, and a processing circuit 820.

Processing circuit 820 includes one or more microprocessors or microcontrollers 825, as well as other digital hardware 830, which may include digital signal processors (DSPs), special-purpose digital logic, and the like. Processing circuit 820 further includes a memory circuit 840, which in this example is configured to provide operating system memory 845, core program memory 850, user application memory 855, and data storage memory 860. Either or both of microprocessor(s) 825 and digital hardware 830 may be configured to execute program code stored in operating system memory 845, core program memory 850, and/or user application memory 855, using data storage memory 860. Because the various details and engineering tradeoffs associated with the design of processing circuitry for mobile devices and the like are well known and are unnecessary to a full understanding of the invention, additional details are not shown here.

The program code stored in the program storage portions of memory 840, which may comprise one or several types of memory such as read-only memory (ROM), random-access memory, cache memory, flash memory devices, optical storage devices, etc., includes program instructions for controlling user-interface circuits 805, controlling local interface 810, and program instructions for handling core applications and user applications. Memory 840 may further contain instructions for carrying out one or more of the techniques detailed herein, in several embodiments, including, for example, the techniques illustrated in FIG. 10. Thus, for example, processing circuit 820 may be configured, with appropriate program instructions in memory 840, to: communicate with at least one remote IP network using Internet Protocol (IP)-based data communications, using Ethernet frames exchanged between the application processor circuit 800 and the modem device 900 via the interface circuit 810; access one or more local modem services provided by the modem device 900, using an IP socket application programming interface (API) and using Ethernet frames exchanged between the application processor circuit 800 and the modem device 900 via the interface circuit 810; and distinguish between Ethernet frames for the local modem services and Ethernet frames for IP-based data communications to and from the at least one remote IP network using differing VLAN identifiers attached to or included within the respective Ethernet frames.

In some embodiments, the processing circuit 820 is configured to distinguish between Ethernet frames for the local modem services and Ethernet frames for the IP-based data communication to and from the at least one remote IP network by attaching a first VLAN identifier value to or in one or more first Ethernet frames sent to the modem device 900 for accessing the one or more local modem services and attaching a second VLAN identifier value to or in one or more second Ethernet frames sent to the modem device 900 and containing IP packets to be delivered to a first remote IP network. In some embodiments, the application processor's processing circuit 820 is configured to communicate with two or more remote IP networks using IP-based data communications, using Ethernet frames exchanged between the application processor circuit 800 and the modem device 900 via the interface circuit 810, where the processing circuit 820 is configured to distinguish between Ethernet frames sent to each of the two or more remote IP networks using differing VLAN identifiers attached to or included within the respective Ethernet frames.

In the above-description of various embodiments of the presently disclosed techniques, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present description, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the inventive techniques and apparatus disclosed herein. All such variations and modifications are intended to be included herein within the scope of the present disclosure.

What is claimed is:

1. A modem device comprising:
a first interface circuit configured to communicate with a remotely located device;
a second interface circuit configured to communicate with an application processor circuit;
a modem processing circuit;

wherein the modem processing circuit is configured to:
provide the application processor circuit with Internet Protocol (IP) -based data communications to and from at least one remote IP network, via the first and second interface circuits, using Ethernet frames exchanged between the application processor circuit and the modem device via the second interface circuit;
provide the application processor circuit with one or more local modem services, using an IP socket application programming interface (API) and using Ethernet frames exchanged between the application processor and the modem device via the second interface circuit, wherein said local modem services comprise a control channel for modem control; and
distinguish between Ethernet frames for the local modem services and Ethernet frames for the IP-based data communication to and from the at least one remote IP network using differing virtual local-area network (VLAN) identifiers attached to or included within the respective Ethernet frames.

2. The modem device of claim 1, wherein the modem processing circuit is configured to distinguish between Ethernet frames for the local modem services and Ethernet frames for the IP-based data communication to and from the at least one remote IP network by:
detecting a first VLAN identifier value attached to or included within one or more first Ethernet frames received from the application processor circuit and processing the one or more first Ethernet frames to provide the application processor circuit with the one or more local modem services; and
detecting a second VLAN identifier value attached to or included within one or more second Ethernet frames received from the application processor circuit and forwarding IP packets carried by the one or more second IP Ethernet frames to the remotely located device, via the first interface circuit, for delivery to a first remote IP network.

3. The modem device of claim 1, wherein the modem processing circuit is configured to provide the application processor circuit with IP-based data communication to and from two or more remote IP networks, via the first and second interface circuits, using Ethernet frames exchanged between the application processor circuit and the modem device via the second interface circuit, and wherein the modem processing circuit is configured to distinguish between Ethernet frames corresponding to each of the two or more remote IP networks using differing VLAN identifiers attached to or included within the respective Ethernet frames.

4. The modem device of claim 3, wherein the modem processing circuit is configured to distinguish between Ethernet frames for IP-based data communication to and from a first remote IP network and Ethernet frames for IP-based data communication to and from a second remote IP network by:
detecting a first VLAN identifier value attached to or included within one or more first Ethernet frames received from the application processor circuit and, in response to detecting the first VLAN identifier value, forwarding IP packets carried by the one or more first IP Ethernet frames to the remotely located device, via the first interface circuit, using a first packet data network (PDN) connection; and
detecting a second VLAN identifier value attached to or included within one or more second Ethernet frames received from the application processor circuit and, in response to detecting the second VLAN identifier value, forwarding IP packets carried by the one or more second IP Ethernet frames to the remotely located device, via the first interface circuit, using a second PDN connection.

5. An application processor circuit comprising:
an interface circuit configured to communicate with a modem device; and
a processing circuit;
wherein the processing circuit is configured to:
communicate with at least one remote IP network using Internet Protocol (IP) —based data communications, using Ethernet frames exchanged between the application processor circuit and the modem device via the interface circuit;
access one or more local modem services provided by the modem device, using an IP socket application programming interface (API) and using Ethernet frames exchanged between the application processor circuit and the modem device via the interface circuit, wherein said one or more local modem services comprises a control channel for modem control; and
distinguish between Ethernet frames for the local modem services and Ethernet frames for IP-based data communications to and from the at least one remote IP network using differing virtual local-area network (VLAN) identifiers attached to or included within the respective Ethernet frames.

6. The application processor circuit of claim 5, wherein the processing circuit is configured to distinguish between Ethernet frames for the local modem services and Ethernet frames for the IP-based data communication to and from the at least one remote IP network by:
attaching a first VLAN identifier value to or in one or more first Ethernet frames sent to the modem device for accessing the one or more local modem services; and
attaching a second VLAN identifier value to or in one or more second Ethernet frames sent to the modem device and containing IP packets to be delivered to a first remote IP network.

7. The application processor circuit of claim 5, wherein the processing circuit is configured to communicate with two or more remote IP networks using IP-based data communications, using Ethernet frames exchanged between the application processor circuit and the modem device via the interface circuit, and wherein the processing circuit is configured to distinguish between Ethernet frames sent to each of the two or more remote IP networks using differing VLAN identifiers attached to or included within the respective Ethernet frames.

8. A method, in a modem device that comprises a first interface circuit configured to communicate with a remotely located device, a second interface circuit configured to communicate with an application processor circuit, and a modem processing circuit, the method comprising:
providing the application processor circuit with Internet Protocol (IP) —based data communications to and from at least one remote IP network, via the first and second interface circuits, using Ethernet frames exchanged between the application processor circuit and the modem device via the second interface circuit;
providing the application processor circuit with one or more local modem services, using an IP socket application programming interface (API) and using Ethernet frames exchanged between the application processor circuit and the modem device via the second interface circuit, wherein said local modem services comprise a control channel for modem control; and distinguishing between Ethernet frames for the local modem services and Ethernet frames for the IP-based data communication to and from the at least one remote IP network using differing virtual local-area network (VLAN) identifiers attached to or included within the respective Ethernet frames.

9. The method of claim 8, wherein distinguishing between Ethernet frames for the local modem services and Ethernet frames for the IP-based data communication to and from the at least one remote IP network comprises:

detecting a first VLAN identifier value attached to or included within one or more first Ethernet frames received from the application processor circuit and, in response to detecting the first VLAN identifier value, processing the one or more first Ethernet frames to provide the application processor circuit with the one or more local modem services; and detecting a second VLAN identifier value attached to or included within one or more second Ethernet frames received from the application processor and, in response to detecting the second VLAN identifier value, forwarding IP packets carried by the one or more second IP Ethernet frames to the remotely located device, via the first interface circuit, for delivery to a first remote IP network.

10. The method of claim 8, wherein providing the application processor with IP-based data communications to and from at least one remote IP network comprises providing the application processor with IP-based data communication to and from two or more remote IP networks, via the first and second interface circuits, using Ethernet frames exchanged between the application processor and the modem device via the second interface circuit, and wherein the method further comprises distinguishing between Ethernet frames corresponding to each of the two or more remote IP networks using differing VLAN identifiers attached to or included within the respective Ethernet frames.

11. The method of claim 10, wherein distinguishing between Ethernet frames corresponding to each of the two or more remote IP networks using differing VLAN identifiers attached to or included within the respective Ethernet frames comprises:

detecting a first VLAN identifier value attached to or included within one or more first Ethernet frames received from the application processor and, in response to detecting the first VLAN identifier value, forwarding IP packets carried by the one or more first IP Ethernet frames to the remotely located device, via the first interface circuit, using a first packet data network (PDN) connection; and detecting a second VLAN identifier value attached to or included within one or more second Ethernet frames received from the application processor and, in response to detecting the second VLAN identifier value, forwarding IP packets carried by the one or more second IP Ethernet frames to the remotely located device, via the first interface circuit, using a second PDN connection.

12. A method, in an application processor circuit that comprises a processing circuit and an interface circuit configured to communicate with a modem device, the method comprising:

communicating with at least one remote IP network using Internet Protocol (IP) —based data communications, using Ethernet frames exchanged between the application processor circuit and the modem device via the interface circuit;

accessing one or more local modem services provided by the modem device, using an IP socket application programming interface (API) and using Ethernet frames exchanged between the application processor circuit and the modem device-via the interface circuit, wherein said local modem services comprise a control channel for modem control; and distinguishing between Ethernet frames for the local modem services and Ethernet frames for IP-based data communications to and from the at least one remote IP network using differing virtual local-area network (VLAN) identifiers attached to or included within the respective Ethernet frames.

13. The method of claim 12, wherein distinguishing between Ethernet frames for the local modem services and Ethernet frames for the IP-based data communication to and from the at least one remote IP network comprises:

attaching a first VLAN identifier value to or in one or more first Ethernet frames sent to the modem device for accessing the one or more local modem services; and attaching a second VLAN identifier value to or in one or more second Ethernet frames sent to the modem device and containing IP packets to be delivered to a first remote IP network.

14. The method of claim 12, wherein communicating with at least one remote IP network using IP-based data communications comprises communicating with two or more remote IP networks using IP-based data communications, using Ethernet frames exchanged between the application processor circuit and the modem device via the interface circuit, and wherein the method further comprises distinguishing between Ethernet frames sent to each of the two or more remote IP networks using differing VLAN identifiers attached to or included within the respective Ethernet frames.

15. A wireless communication device comprising:
a modem device; and
an application processing circuit;
wherein the modem device comprises:
a first interface circuit configured to communicate with a remotely located device;
a second interface circuit configured to communicate with an application processor circuit; and
a modem processing circuit;
wherein the modem processing circuit is configured to:
provide the application processor circuit with Internet Protocol (IP) -based data communications to and from at least one remote IP network, via the first and second interface circuits, using Ethernet frames exchanged between the application processor circuit and the modem device via the second interface circuit;
provide the application processor circuit with one or more local modem services, using an IP socket application programming interface (API) and using Ethernet frames exchanged between the application processor and the modem device via the second interface circuit; and
distinguish between Ethernet frames for the local modem services and Ethernet frames for the IP-based data communication to and from the at least one remote IP network using differing virtual local-area network (VLAN) identifiers attached to or included within the respective Ethernet frames; and wherein the application processor circuit comprises:
an interface circuit configured to communicate with a modem device; and
a processing circuit;
wherein the processing circuit is configured to:
communicate with at least one remote IP network using Internet Protocol (IP)—based data communications, using Ethernet frames exchanged between the application processor circuit and the modem device via the interface circuit;
access one or more local modem services provided by the modem device, using an IP socket application programming interface (API) and using Ethernet frames exchanged between the application processor circuit and the modem device via the interface circuit, wherein said one or more local modem services comprises a control channel for modem control; and
distinguish between Ethernet frames for the local modem services and Ethernet frames for IP-based data communications to and from the at least one remote IP network using differing virtual local-area network (VLAN) identifiers attached to or included within the respective Ethernet frames.

* * * * *